United States Patent [19]

Rowland-Hill

[11] 3,927,678
[45] Dec. 23, 1975

[54] CONCAVE FOR AN AXIAL FLOW THRESHING AND SEPARATING MACHINE

[75] Inventor: Edward W. Rowland-Hill, Lancaster, Pa.

[73] Assignee: Sperry Rand Corporation, New Holland, Pa.

[22] Filed: May 2, 1974

[21] Appl. No.: 466,100

[52] U.S. Cl. .............................................. 130/27 T
[51] Int. Cl.² ........................................ A01F 7/06
[58] Field of Search ............ 130/27 J, 27 T, 27 HA, 130/27 R; 171/118, 116; 198/220

[56] References Cited
UNITED STATES PATENTS

| | | | |
|---|---|---|---|
| 1,814,029 | 7/1931 | Free | 171/116 |
| 2,828,825 | 4/1958 | Johnson | 171/118 |
| 3,295,667 | 1/1967 | Kittle | 198/220 |
| 3,848,609 | 11/1974 | Mortier | 130/27 T |

Primary Examiner—G. E. McNeill
Attorney, Agent, or Firm—Frank A. Seemar; John R. Flanagan; Joseph A. Brown

[57] ABSTRACT

The present invention is directed to concaves used in axial flow threshing and separating machines which will facilitate the movement of all types of crop material across and through the concave.

8 Claims, 7 Drawing Figures

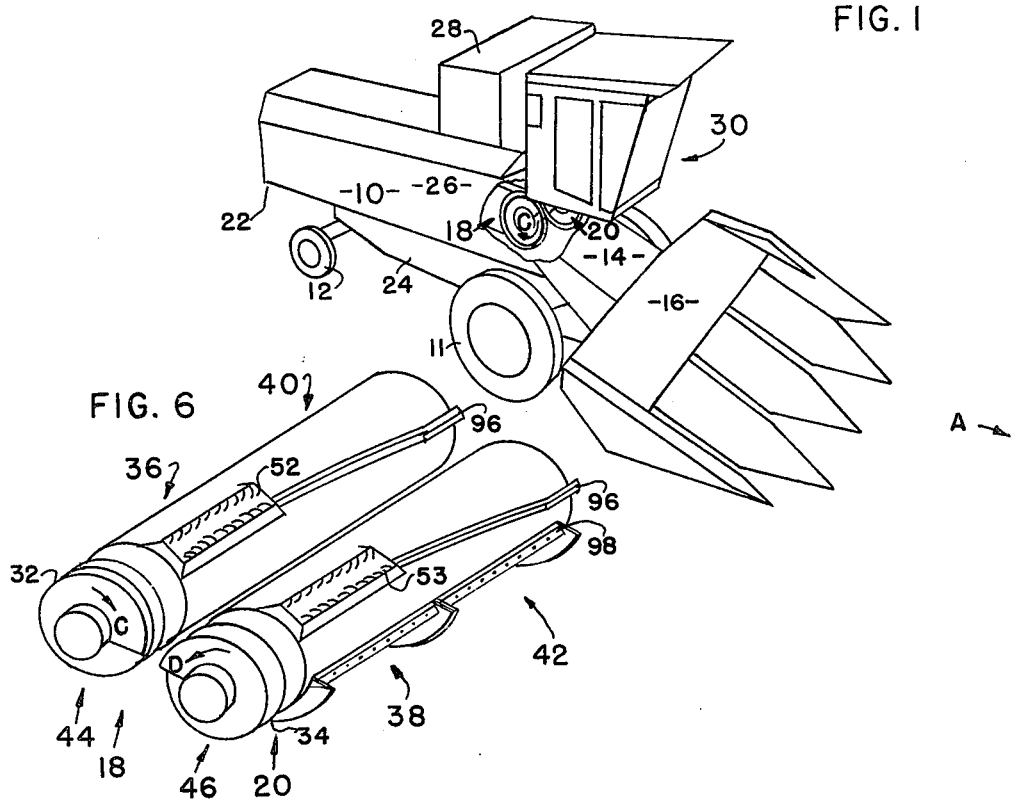
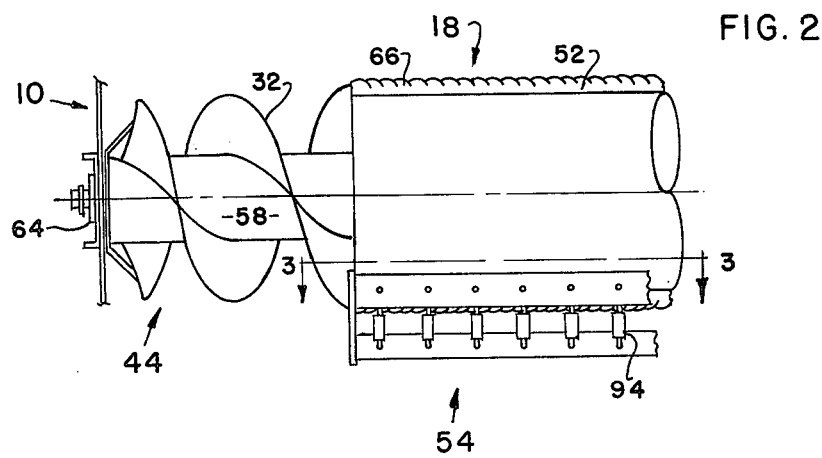

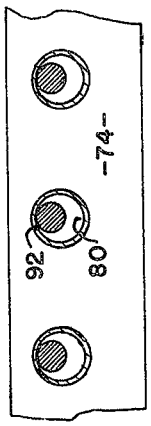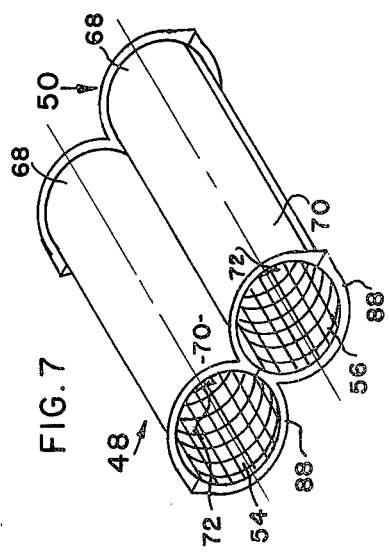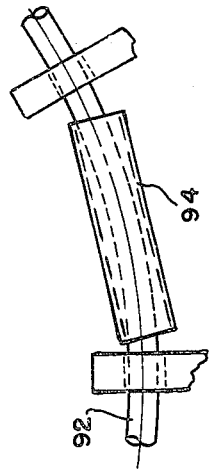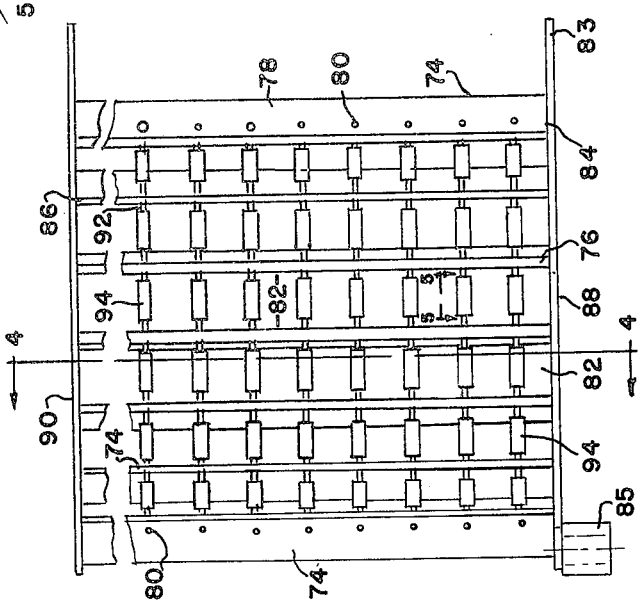

CONCAVE FOR AN AXIAL FLOW THRESHING AND SEPARATING MACHINE

BACKGROUND OF THE INVENTION

This invention relates generally to axial flow type combines and more particularly to concaves used in such combines.

In present commercially available combines, the threshing cylinders and concaves are positioned transverse to the line of travel of the combine and the flow of crop material therethrough. In axial flow type combines the threshing and separating units extend axially and the crop material is fed into the end of the threshing and separating section in a direction longitudinal to the rotor and concave. The rotor circumferentially sweeps the incoming crop material so as to cross the concave several times during the threshing and separating operation. This type of motion makes it imperative that the threshed grain be discharged through the concave as soon as possible to prevent any kernel damage. To do this, it is necessary to eliminate any clogging of the concave by unthreshed crop material.

It has been noted that in situations where either the crop material was damp or in high moisture corn conditions traditional type concaves would clog, thereby preventing the grain from being effectively removed from the incoming crop. The above described condition occurs when the crop adheres to a portion of the concave so as to obstruct the openings contained in the concave. This causes kernel damage in some crop conditions as well as creating an uneven distribution of material across the cleaning system. This uneven distribution across the cleaning system affects the overall effectiveness of the cleaning operation of the combine.

It is the purpose of this invention to provide a concave for use in an axial flow type threshing and separating machine which will eliminate clogging of the concave in all crop conditions.

OBJECTS AND SUMMARY OF THE INVENTION

An object of this invention is to provide an axial flow threshing and separating machine with a concave that will remain free of debris during the harvesting operation.

Another object of this invention, is to provide an axial flow threshing and separating machine with a concave that will facilitate the movement of all types of crop material across the concave.

A further object of the present invention is to provide an axial flow threshing and separating machine with an inexpensive concave that utilizes the advantages of conventional type concaves while remaining free of debris during the harvesting operation.

In summary, this invention is directed to concaves used in axial flow threshing and separating machines which will facilitate the movement of damp and high moisture crop material across and through the concave and prevent the accumulating of debris in the concave thereby increasing the effectiveness of the concave in all crop conditions.

These and other objects and advantages of this invention will be apparent to those skilled in the art after a consideration of the following detailed description, taken in conjunction with the accompanying drawings in which the preferred form of this invention is illustrated.

BRIEF DESCRIPTION OF THE DRAWINGS

FIG. 1 is a perspective view of an axial flow type threshing and separating machine.

FIG. 2 is a fragmentary side view of the threshing and separating section with concave and rotor.

FIG. 3 is a view taken along lines 3—3 of FIG. 2.

FIG. 4 is an enlarged fragmentary view taken along lines 4–4 of FIG. 3.

FIG. 5 is an enlarged view taken along lines 5—5 of FIG. 3.

FIG. 6 is a perspective view of the threshing and separating sections.

FIG. 7 is a perspective view of casings of an axial flow type threshing and separating machine.

DETAILED DESCRIPTION OF THE PREFERRED EMBODIMENT

In the following description of the combine, the various parts are referred to as being left or right on viewing the combine in the direction of travel A. The direction of travel is opposite to the direction of movement of the crop material through the combine.

FIG. 1 is a perspective view of the right side of the combine with the various drives omitted. The combine comprises a main housing or frame 10 mounted on two forward drive wheels 11 and two rear steering wheels 12 (only one wheel of each pair being shown). The crop elevator 14 and header 16 are mounted on the front of main housing 10 to harvest the crop and feed it to the threshing and separating units 18, 20 mounted in main housing 10. The units thresh and separate the grain from the crop material and discharge the grainless crop material from the rear of the combine through a large opening in hood 22. Grain cleaning means are provided within the main housing for separating chaff from the grain. A casing 24 extends below the main frame for housing the blower and the grain and tailings collecting means. On top of the combine is an engine 26 and a grain tank 28. An operator's cab 30 is mounted on the front of the housing above the crop elevator 14.

The right and left threshing and separating units 18, 20 are arranged side-by-side as illustrated in FIG. 6. The forward feed augers 32, 34, intermediate threshing and separating sections 36, 38, and separating sections 40, 42 are formed by rotors 44, 46 and casings 48, 50. A fragmentary view of the right threshing and separating unit, depicting the rotor 44, feed auger 32, rasp bar 52 and threshing and separating concave 54, is illustrated in FIG. 2. The left threshing and separating unit is identical to the right except for the use of the left hand feed auger rather than the right hand feed auger and the fact that the rotors rotate in opposite directions.

The right and left threshing and separating units have rotors 44, 46, rotating in opposite directions C and D respectively, so that the rasp bars 52, 53 are moving initially downwardly across the concaves 54, 56 at the center of the combine. This type of rotation and positioning of the units allows the majority of grain removed from the incoming crop material to accumulate at the center of the combine rather than towards the sides of the combine. This type of grain accumulation permits an ideal distribution of material on the grain cleaning apparatus (not shown) thereby prompting a more efficient and effective utilization of the air stream of the cleaning apparatus.

FIG. 2 shows a portion of the threshing and separating unit including feed auger 32 mounted on tubular shaft 58. This shaft is rotatably mounted in bearing 64 mounted to the forwardmost wall of main housing 10. The incoming crop material is carried from header 16 by crop elevator 14 to a ramp means (not shown) which directs the material up and into an intermediate position of the auger flights. A crop divider (not shown) divides the incoming crop material into two substantially equal streams for more efficient introduction into the threshing and separating units.

On feeding of the crop material into the feed augers of the threshing and separating units the material will be directed rearwardly and circumferentially around the respective casings to the rasp bars.

Once the crop material reaches rasps bars 52, 53 it continues to be circumferentially carried around casings 48, 50 and across concaves 54, 56. The rasp bars direct and agitate the material as they draw the material across the concaves. As illustrated in FIG. 2 the rasp bars 52 have raised portions or rasps 66 extending radially from the rotor. The rasp bars are rigidly mounted to the rotors (by welding or the like) behind the respective feed auger and continue along the length of the rotor to the separating sections 40, 42.

The rotors 44, 46 are mounted within cylindrical casings 48, 50. These casings contain top, and sidewall portions 68, 70, respectively, which encompass a majority of the rotors. The top wall portion 68 of the casings contain direction vanes 72 mounted on the inner side of the top wall. These vanes are positioned at an angle to the axis of the rotor to assist the rasp bars in directing the material longitudinally through the casings. Mounted between the sidewalls of the casings are the concaves 54, 56. These concaves have elongated beams 74 which extend longitudinally (as shown in FIGS. 3 and 7) and have rectangular configuration with rectangular edges 76. The edges extend above the concave to cooperate with the rotating rasp bars to thresh and separate the material. The elongated beams have body portions 78 which contain a plurality of spaced aperturues 80. Mounted by welding or other suitable means, to the respective ends 84, 86 of beams 74 are curved transverse members 88, 90. These members have the same radius of curvature as the top and sidewall portions of the casing and are fitted with mountings 83, 85 which mount to sidewalls 70 of the casings. The ends 84, 86 of the beams are mounted to members 88, 90 in spaced parallel relation to each other as shown in FIG. 3. This type of positioning creates a concave structure which has the same radius of curvature as the other sections of the casings. Also, such positioning allows the apertures contained in the body portions 78 of the beams to be aligned. These apertures are adapted to receive wire or rod segments 92 which divide the longitudinal spaces formed between the beams into rectangular spaces 82. These wires 92 extend circumferentially through the respective beams and can be inserted or removed from the outer edges of the concave. This allows the size of the rectangular spaces 82 to be varied by the distance established between the wires 94. The choice for the size of the spacings depends on the type of crop being threshed.

The above described concave is the type that has been traditionally used on both conventional and axial flow type harvesting machines. It had been thought that, by the simple rearrangement of wire 92 and the arrangement of spacings 82, all type crop conditions could be handled. However, this proved not to be the case. For example, the variation of the size of the rectangular spaces would not prevent clogging of the concave under many conditions. This problem was alleviated by adding cylindrically shaped rollers 94 to wires 92 and positioning them between beams 74 to assist in the movement of crop material across and through the concave. As illustrated in FIGS. 4 and 5, these rollers are freely mounted on the wires so that they can be easily inserted or removed when the wire is passed through the apertures. This type of roller maintains the desirable features of conventional concaves (i.e. the ability to vary the size of the rectangular spaces by the addition or removal of wire segments) while improving the movement of the crop material over and through the concave. It is this improved movement of material over and through the concave which decreases the clogging experienced in conventional concaves.

Mounted directly to the rear of the threshing and separating sections of the rotors are the separating sections 40. 42. These sections are contained within the rear portion of casings 48, 50 and include paddles 96 rigidly mounted to and extending radially from tubular shaft 58 and grates 98 having essentially the same configuration as the aforementioned concaves. The function of the separating sections is to remove from the mat of crop material any grain which, though loosened in the threshing and separating section, is still embedded in the material. Once the material has passed through the separating sections it is then discharged through opening 22 at the rear of the combine.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

Having thus described the invention, what is claimed is:

1. An axial flow threshing and separating machine comprising:
    A. a frame adapted to travel across a field,
    B. at least one cylindrical casing mounted on the frame having top and sidewall portions,
    C. means mounted on the forward portion of said frame to deliver material from the field to the casing,
    D. rotor means extending longitudinally within said casing,
    E. means mounted on the rotor and extending radially from said rotor to agitate and direct the material circumferentially and longitudinally through said casing,
    F. concave means adjustably mounted to the sidewall portions, the concave means including a plurality of elongated beams having end and body portion the body portion containing a plurality of apertures therein,
        transverse members rigidly mounted to the ends of said beams to maintain said beams in spaced parallel relation to each other such that the apertures of said beams are in alignment with each other, spacing means positioned through said apertures and extending across the width of concave to form a grid through which threshed and separated material can pass, and G. means rotatably mounted to the spacing means to facilitate the movement of said material over and through said concave.

2. An axial flow threshing and separating machine as set forth in claim 1 wherein said spacing means comprise wire segments having a diameter less than the diameter of said apertures.

3. An axial flow threshing and separating machine as set forth in claim 2 wherein the means to facilitate the movement of said material comprise a plurality of rollers rotatably mounted on the wire segments.

4. An axial flow threshing and separating machine as set forth in claim 3 wherein the rollers have a cylindrical shape and have a length slightly less than the distance between said elongated beams.

5. An axial flow threshing and separating machine as set forth in claim 1 wherein said transverse members are curved so as to have the same radius of curvature as said casing.

6. In an axial flow threshing and separating machine having a wheeled frame,
at least one cylindrical casing mounted to the frame having top, side and lower concave portions, means mounted on the forward portion of said frame to deliver material from the field to the casing, rotor means extending longitudinally within said casing, means mounted on the rotor and extending radially from said rotor to agitate and direct said material longitudinally through said casing and across and through the concave thereby releasing grain contained in said material through said concave, wherein the improvement comprises:
means rotatably mounted to said concave to facilitate movement of said material across and through said concave.

7. An axial flow threshing and separating machine as set forth in claim 6 wherein said concave includes elongated longitudinal beams, curved transverse members rigidly mounted to the longitudinal beams, and spacing means positioned across and secured to said beams.

8. An axial flow threshing and separating machine as set forth in claim 7, wherein the means to facilitate movement of said crop material comprise roller means rotatably mounted to the spacing means.

* * * * *